United States Patent
Babar et al.

(10) Patent No.: US 10,047,253 B2
(45) Date of Patent: Aug. 14, 2018

(54) METHOD FOR APPLYING DISPERSION ADHESIVES

(71) Applicant: WACKER CHEMIE AG, München (DE)

(72) Inventors: Muhammad Babar, Burghausen (DE); Gerhard Kögler, Burgkirchen (DE); Hans-Peter Weitzel, Reischach (DE)

(73) Assignee: Wacker Chemie AG, Munich (DE)

(*) Notice: Subject to any disclaimer, the term of this patent is extended or adjusted under 35 U.S.C. 154(b) by 53 days.

(21) Appl. No.: 15/104,307

(22) PCT Filed: Dec. 15, 2014

(86) PCT No.: PCT/EP2014/077794
§ 371 (c)(1),
(2) Date: Jun. 14, 2016

(87) PCT Pub. No.: WO2015/091375
PCT Pub. Date: Jun. 25, 2015

(65) Prior Publication Data
US 2016/0312083 A1    Oct. 27, 2016

(30) Foreign Application Priority Data

Dec. 16, 2013 (DE) .......... 10 2013 226 113

(51) Int. Cl.
*C09J 131/04* (2006.01)
*C09J 5/00* (2006.01)
*C08L 29/04* (2006.01)

(52) U.S. Cl.
CPC .......... *C09J 131/04* (2013.01); *C08L 29/04* (2013.01); *C09J 5/00* (2013.01); *C09J 2431/00* (2013.01)

(58) Field of Classification Search
None
See application file for complete search history.

(56) References Cited

U.S. PATENT DOCUMENTS

| | | | | |
|---|---|---|---|---|
| 5,331,055 A | * | 7/1994 | Fujiwara | C08F 263/00 525/244 |
| 6,569,961 B1 | * | 5/2003 | Adams | B01J 19/2435 422/132 |
| 2002/0032268 A1 | | 3/2002 | Weltzel | |
| 2008/0039572 A1 | * | 2/2008 | Mueller | C08F 218/08 524/457 |
| 2008/0044565 A1 | | 2/2008 | Mueller et al. | |
| 2013/0102702 A1 | | 4/2013 | Hain et al. | |

FOREIGN PATENT DOCUMENTS

| | | | |
|---|---|---|---|
| CN | 102695725 A | 9/2012 | |
| EP | 1174446 A1 | 1/2002 | |
| EP | 1887018 A2 * | 2/2008 | ........... C08F 218/08 |
| EP | 1889890 A1 | 2/2008 | |

OTHER PUBLICATIONS

J. Wiley & Sons, New York (1975).
Fox T. G., Bull. Am. Physics Soc. 1, 3, p. 123.

* cited by examiner

*Primary Examiner* — Michael P. Rodriguez
(74) *Attorney, Agent, or Firm* — RatnerPrestia

(57) ABSTRACT

The invention relates to a method for applying dispersion adhesives containing one or more polyvinyl esters and optionally one or more additives, characterized in that one or more polyvinyl esters are produced by radical-initiated, continuous emulsion polymerization of a) one or more vinyl esters and, optionally, b) one or more additional ethylenically unsaturated monomers, and the dispersion adhesives are applied to a substrate by way of mechanical application methods.

11 Claims, No Drawings

METHOD FOR APPLYING DISPERSION ADHESIVES

CROSS-REFERENCE TO RELATED APPLICATIONS

This application is the U.S. National stage filing of International Application No. PCT/EP2014/077794, filed 15 Dec. 2014, and claims priority of German application number 10 2013 226 113.6, filed 16 Dec. 2013, the entireties of which applications are incorporated herein by reference.

FIELD OF THE INVENTION

The invention relates to dispersion-based adhesives and also to methods for applying dispersion-based adhesives based on polyvinyl esters by machine application methods, more particularly production line methods, such as nozzle or roll application methods.

BACKGROUND OF THE INVENTION

Dispersion-based adhesives based on polyvinyl esters find multifarious application, as for example in the adhesive bonding of paper or cardboard packaging for producing folding boxes, envelopes, brochures, or cigarettes. Products of this kind are customarily manufactured industrially by production line fabrication. The dispersion-based adhesives in such applications are applied to the substrate generally by machine application methods such as nozzle application systems or roll technologies. With these application methods, instances of adhesive-related fouling, caused by imprecise or uncontrolled application of adhesive, also referred to as "splashing", lead to fabrication problems. If adhesive gets onto the conveyor belt, there may be instances of sticking of the fabricated material, resulting in machine downtime and inconvenient cleaning work. Nozzle application is frequently accompanied by conical deposits at the nozzle exit point, diverting the jet of adhesive emerging from the nozzle. This is detrimental to precise control of adhesive application and can also lead to contamination and, ultimately, to the shutdown of the unit. In nozzle application systems, the dispersion-based adhesives are supplied by pumps through line systems to a nozzle having a rapidly opening and closing valve, with switching frequencies of up to 1000/second, for example. Nozzle valve cycle frequencies of such levels subject the dispersion-based adhesives inside the nozzle to extremely high shearing forces. Suitable dispersion-based adhesives are required accordingly to have very high shear stability.

The application of dispersion-based adhesives by machine methods is described for example in EP-A 1889890 or in EP-A 1887018. The polyvinyl esters used for such application have been prepared by emulsion polymerization according to batch or semibatch processes. There continues nevertheless to be a need for dispersion-based adhesives which even better meet the requirements of machine application methods.

SUMMARY OF THE INVENTION

Against this background, the problem addressed was that of providing new measures for applying dispersion-based adhesives based on polyvinyl esters by machine application methods that allow one or more of the problems identified above to be avoided or reduced.

Surprisingly this problem has been solved by preparing the polyvinyl esters present in the dispersion-based adhesives by continuous, radically initiated emulsion polymerization.

DETAILED DESCRIPTION OF THE INVENTION

The invention provides methods for applying dispersion-based adhesives comprising one or more polyvinyl esters and optionally one or more additives, characterized in that the polyvinyl esters are prepared by radically initiated, continuous emulsion polymerization of a) one or more vinyl esters and optionally b) one or more further ethylenically unsaturated monomers, and the dispersion-based adhesives are applied to a substrate by machine application methods.

The invention further provides dispersion-based adhesives comprising one or more polyvinyl esters, one or more additives, and water, characterized in that the polyvinyl esters are obtainable by radically initiated, continuous emulsion polymerization of a) one or more vinyl esters and optionally b) one or more further ethylenically unsaturated monomers in the absence of emulsifiers, and the polyvinyl esters have a polydispersity PD of at least 21, and the fraction of the polyvinyl esters in the dispersion-based adhesives is 40 to 99 wt %, based on the dry weight of the dispersion-based adhesives.

Dispersion-based adhesives of this kind are especially suitable for the method of the invention and for solving the problem addressed by the invention.

Suitable vinyl esters a) are, for example, those of carboxylic acids having 1 to 22 C atoms, more particularly 1 to 12 C atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9R or VeoVa10R (trade names of the company Momentive). Particularly preferred is vinyl acetate.

The vinyl esters a) are used in an amount of preferably 50 to 100 wt %, more preferably 70 to 95 wt %, and most preferably 75 to 90 wt %, based in each case on the total weight of the monomers.

Selected as further ethylenically unsaturated monomers b1) are, in particular, one or more olefins, such as propylene or, preferably, ethylene.

The monomers b1) are copolymerized in an amount of preferably 5 to 40 wt %, more preferably 5 to 30 wt %, and most preferably 10 to 25 wt %, based in each case on the total weight of the monomers.

As further ethylenically unsaturated monomers b2) it is also possible, optionally in combination with one or more olefins, such as ethylene, to select one or more ethylenically unsaturated monomers from the group encompassing (meth) acrylic esters, vinylaromatics, 1,3-dienes, and vinyl halides.

Suitable monomers from the group of the esters of acrylic acid or methacrylic acid are, for example, esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate. Particularly preferred are methyl acrylate, methyl methacrylate, n-butyl acrylate, and 2-ethylhexyl acrylate.

Preferred vinylaromatics are styrene, methylstyrene, and vinyltoluene. Preferred vinyl halide is vinyl chloride. The preferred dienes are 1,3-butadiene and isoprene.

The monomers b2) are copolymerized in an amount of preferably 0 to 45 wt % and more preferably 10 to 30 wt %, based in each case on the total weight of the monomers. Most preferably no monomers b2) are copolymerized.

Optionally it is possible as well for 0 to 10 wt %, more particularly 0.05 to 10 wt %, based on the total weight of the monomer mixture, of auxiliary monomers to be copolymerized. Most preferably, however, no auxiliary monomers are copolymerized. Examples of auxiliary monomers are ethylenically unsaturated mono- and dicarboxylic acids, preferably acrylic acid, methacrylic acid, fumaric acid, and maleic acid; ethylenically unsaturated carboxamides and carbonitriles, preferably acrylamide and acrylonitrile; mono- and diesters of fumaric acid and maleic acid such as the diethyl and diisopropyl esters, and also maleic anhydride, ethylenically unsaturated sulfonic acids and/or their salts, preferably vinylsulfonic acid, 2-acrylamido-2-methylpropanesulfonic acid. Further examples are precrosslinking comonomers such as polyethylenically unsaturated comonomers, as for example divinyl adipate, diallyl maleate, allyl methacrylate, triallyl isocyanurate, or triallyl cyanurate, or postcrosslinking comonomers, as for example acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)silanes, vinyltrialkoxysilanes, and vinylmethyldialkoxysilanes, where alkoxy groups present may be, for example, ethoxy and ethoxypropylene glycol ether radicals. Mention may also be made of monomers having hydroxyl or CO groups, examples being methacrylic and acrylic hydroxyalkyl esters such as hydroxyethyl, hydroxypropyl, or hydroxybutyl acrylate or methacrylate, and also compounds such as diacetoneacrylamide and acetylacetoxyethyl acrylate or methacrylate.

Preference is given to one or more polyvinyl esters selected from the group encompassing vinyl ester homopolymers, vinyl ester copolymers, especially vinyl ester-ethylene copolymers, vinyl ester copolymers comprising one or more vinyl ester units and one or more further monomer units from the group encompassing vinylaromatics, vinyl halides, acrylic esters, methacrylic esters, and, optionally, ethylene.

Examples of preferred vinyl ester copolymers are based on 50 to 90 wt % of one or more vinyl esters, 10 to 25 wt % of ethylene, and optionally 1 to 40 wt % of one or more further monomers, based on the total weight of the monomers.

Preference is also given to comonomer mixtures of vinyl acetate with 10 to 25 wt % of ethylene; and to comonomer mixtures of vinyl acetate with 10 to 25 wt % of ethylene and 1 to 40 wt % of one or more further comonomers from the group of vinyl esters having 1 to 12 C atoms in the carboxylic acid radical such as vinyl propionate, vinyl laurate, vinyl esters of alpha-branched carboxylic acids having 9 to 11 C atoms such as VeoVa9, VeoVa10, VeoVa11; and to mixtures of vinyl acetate, 10 to 25 wt % of ethylene, and preferably 1 to 40 wt % of acrylic esters of unbranched or branched alcohols having 1 to 15 C atoms, more particularly n-butyl acrylate or 2-ethylhexyl acrylate; and to mixtures with 30 to 75 wt % of vinyl acetate, 1 to 30 wt % of vinyl laurate or vinyl esters of an alpha-branched carboxylic acid having 9 to 11 C atoms, and also 1 to 30 wt % of acrylic esters of unbranched or branched alcohols having 1 to 15 C atoms, more particularly n-butyl acrylate or 2-ethylhexyl acrylate, which also comprise 10 to 25 wt % of ethylene; and also to mixtures with vinyl acetate, 10 to 25 wt % of ethylene, and 1 to 60 wt % of vinyl chloride; the mixtures may also comprise the stated auxiliary monomers in the stated amounts, and the figures in wt % add up to 100 wt % in each case.

The polyvinyl esters have weight-average particle diameters Dw of preferably 500 nm to 15 μm, more preferably 1 μm to 12 μm, and most preferably 2 μm to 9 μm (determined by means of static light scattering with the LS 13320 instrument from BeckmanCoulter).

The polyvinyl esters have a polydispersity PD of preferably ≥21, more preferably 21 to 100, very preferably 25 to 90, even more preferably 30 to 80, and most preferably of 40 to 80. The polydispersity PD stands conventionally for the ratio of weight-average particle diameter Dw to number-average particle diameter Dn, PD=Dw/Dn (determined by static light scattering with the LS 13320 instrument from BeckmanCoulter). The polyvinyl esters are preferably bimodal or multimodal.

The polyvinyl esters in the form of aqueous dispersions having a solids content of 50% have a Brookfield viscosity of preferably ≤8000 mPas, more preferably 2000 to 6000 mPas, and most preferably 3000 to 5000 mPas (determined with a Brookfield viscometer, at 23° C. and 20 rpm, using the spindles customarily used by the skilled person for the respective viscosity range).

The polyvinyl esters have glass transition temperatures Tg of preferably −20° C. to +40° C., more preferably −10° C. to +30° C., very preferably of 0° C. to +15° C., and most preferably of +1° C. to +10° C. The monomer selection and/or the selection of the weight fractions of the comonomers are made such as to result in the aforesaid glass transition temperatures Tg. The glass transition temperature Tg of the polymers is determined using a Mettler-Toledo DSC1 dynamic scanning calorimeter in an open crucible at a heating rate of 10 K/min. The midpoint of the glass transition during the $2^{nd}$ heating cycle is evaluated. The Tg may also be calculated approximately in advance using the Fox equation. According to Fox T. G., Bull. Am. Physics Soc. 1, 3, page 123 (1956): $1/Tg=x_1/Tg_1+x_2/Tg_2+ \ldots +x_n/Tg_n$, where $x_n$ is the mass fraction (wt %/100) of the monomer n, and $Tg_n$ is the glass transition temperature in kelvins of the homopolymer of the monomer n. Tg values for homopolymers are listed in Polymer Handbook 2nd Edition, J. Wiley & Sons, New York (1975).

The polymers are prepared by the emulsion polymerization process. The emulsion polymerization takes place customarily in aqueous medium, i.e., customarily in the absence of organic solvents. In the case of copolymerization of gaseous comonomers such as ethylene, 1,3-butadiene, or vinyl chloride, operation may also take place under pressure, generally of between 5 bar and 100 bar, preferably between 65 and 80 bar.

The polymerization temperature is generally 40° C. to 100° C., preferably 50° C. to 80° C., and more preferably 55 to 70° C. Polymerization at such temperatures produces polyvinyl ester dispersions having particularly advantageous rheological properties and also high setting rates.

The polymerization is initiated preferably with the redox initiator combinations that are commonplace for emulsion polymerization. Examples of suitable oxidation initiators are the sodium, potassium, and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Preference is given to the sodium, potassium, and ammonium salts of peroxodisulfuric acid and to hydrogen peroxide. The stated initiators are used in general in an amount of 0.01 to 2.0 wt %, based on the total weight of the monomers.

The stated oxidizing agents, particularly the salts of peroxodisulfuric acid, may also be used alone as thermal initiators.

Examples of suitable reducing agents are the sulfites and bisulfites of the alkali metals and of ammonium, such as sodium sulfite, the derivatives of sulfoxylic acid such as zinc or alkali metal formaldehyde-sulfoxylates, as for example sodium hydroxymethanesulfinate (Brüggolit), (iso)ascorbic acid or salts thereof, and mixtures of the salts of 2-hydroxy-2-sulfinatoacetic acid and 2-hydroxy-2-sulfonatoacetic acid with sodium sulfite (FF6). Preference is given to sodium sulfite, sodium bisulfite, and especially (iso)ascorbic acid or the alkali metal (or alkaline earth metal) salts thereof, and to FF6. The amount of reducing agent is preferably 0.015 to 3 wt %, based on the total weight of the monomers.

The polymerization is carried out customarily at pH levels of ≥9, preferably 2 to 9, and more preferably 3 to 4.5. The pH can be adjusted using the usual measures, such as acids, bases, or buffers, such as sodium acetate or phosphates.

To control the molecular weight it is possible to use regulator substances during the polymerization. If chain transfer agents are used for regulation, they are employed customarily in amounts between 0.01 to 5.0 wt %, based on the total weight of the monomers to be polymerized, and are metered in separately or else as a premix with reaction components. Examples of such agents are n-dodecyl mercaptan, tert-dodecyl mercaptan, mercaptopropionic acid, methyl mercaptopropionate, isopropanol, and acetaldehyde. With preference no regulator substances are used.

The emulsion polymerization is carried out preferably in the presence of one or more protective colloids. Examples of protective colloids are polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine-formaldehydesulfonates, naphthalene-formaldehydesulfonates, styrene-maleic acid copolymers, and vinyl ether-maleic acid copolymers.

Preferred protective colloids are polyvinyl alcohols. Particular preference is given to using no protective colloids other than polyvinyl alcohols. Preferred dispersion-based adhesives contain no protective colloids other than polyvinyl alcohols.

The polyvinyl alcohols may be in partly or fully hydrolyzed form. Partly hydrolyzed polyvinyl alcohols are preferred. The degree of hydrolysis of the polyvinyl alcohols is preferably 80 to 95 mol %, more preferably 83 to 92 mol %, and most preferably 85 to 90 mol %.

The polyvinyl alcohols are preferably composed exclusively of vinyl alcohol units and vinyl acetate units. It is, however, also possible for partly hydrolyzed, hydrophobically modified polyvinyl alcohols to be used. Examples of such are partly hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates such as diisopropyl maleate and diisopropyl fumarate, vinyl chloride, vinyl alkyl ethers such as vinyl butyl ether, olefins such as ethene and decene. The fraction of the hydrophobic units is preferably from 0.1 to 10 wt %, based on the total weight of the partly hydrolyzed polyvinyl alcohol. Mixtures of the stated polyvinyl alcohols may also be used. Further preferred polyvinyl alcohols are partly hydrolyzed, hydrophobized polyvinyl alcohols, which are obtained by polymer-analogous reaction, as for example acetalization of the vinyl alcohol units with $C_1$ to $C_4$ aldehydes such as butyraldehyde. The fraction of the hydrophobic units is preferably 0.1 to 10 wt %, based on the total weight of the partly hydrolyzed polyvinyl acetate. With particular preference no hydrophobically modified polyvinyl alcohols are used.

The protective colloids are added in general in an amount of in total 0.5 to 20 wt %, preferably 0.5 to 10 wt %, and more preferably 1 to 7 wt %, based on the total weight of the ethylenically unsaturated monomers, in the emulsion polymerization.

The viscosity of the polyvinyl alcohols is preferably 1 to 60 mPas. These figures, and also those below, for the viscosities of polyvinyl alcohols relate to the Happier viscosity, determined in each case at 20° C. in accordance with DIN 53015 in 4% strength aqueous solution.

Particularly preferred are medium-viscosity polyvinyl alcohols. Medium-viscosity polyvinyl alcohols have viscosities of preferably 19 to 39 mPas, more preferably 20 to 35 mPas, very preferably 21 to 30 mPas and most preferably 23 to 27 mPas.

The fraction of the medium-viscosity polyvinyl alcohols is preferably 0.5 to 6.0 wt %, more preferably 1.0 to 5.0 wt %, very preferably 2.0 to 4.5 wt %, and most preferably 3.0 to 4.5 wt %, based in each case on the dry weight of the polyvinyl esters.

In one preferred embodiment the emulsion polymerization takes place in the presence of at least two polyvinyl alcohols, with at least one polyvinyl alcohol being a medium-viscosity polyvinyl alcohol. With particular preference the emulsion polymerization takes place in the presence of at least one medium-viscosity polyvinyl alcohol and of at least one polyvinyl alcohol having a viscosity of 40 to 60 mPas (high-viscosity polyvinyl alcohol).

The high-viscosity polyvinyl alcohol has a viscosity of preferably 40 to 60 mPas and more preferably 45 to 55 mPas. The fraction of the high-viscosity polyvinyl alcohols is preferably 0.01 to 2.5 wt %, more preferably 0.1 to 2 wt %, very preferably 0.2 to 1.5 wt %, and most preferably 0.3 to 1.0 wt %, based in each case on the dry weight of the polyvinyl esters.

The total amount of high-viscosity polyvinyl alcohols and medium-viscosity polyvinyl alcohols is preferably 0.6 to 6.1 wt %, more preferably 1.1 to 5.5 wt %, very preferably 2.2 to 4.5 wt %, and most preferably 3.0 to 4.0 wt %, based in each case on the dry weight of the polyvinyl esters.

The emulsion polymerization may optionally take place in the presence of one or more low-viscosity polyvinyl alcohols, preferably in combination with one or more medium-viscosity polyvinyl alcohols and/or one or more high-viscosity polyvinyl alcohols. Low-viscosity polyvinyl alcohols have viscosities of preferably 1 to 18 mPas, more preferably of 1 to 15 mPas, very preferably 1 to 10 mPas, and most preferably of 2 to 8 mPas. The fraction of the low-viscosity polyvinyl alcohols is preferably 0.01 to 5.0 wt %, more preferably 0.1 to 3.0 wt %, very preferably 1.0 to 2.5 wt %, and most preferably 1.0 to 2.0 wt %, based in each case on the dry weight of the polyvinyl esters.

The use of polyvinyl alcohols in accordance with the invention is particularly advantageous for the wet adhesion of applied dispersion-based adhesives.

The stated polyvinyl alcohols are accessible by means of methods known to the skilled person.

In the emulsion polymerization process, polymerization may also take place in the presence of emulsifiers. Preferred amounts of emulsifiers are 0 to 7 wt %, more particularly 1 to 7 wt %, based on the total weight of the monomers. The emulsion polymerization takes place preferably in the absence of emulsifiers. Preferred dispersion-based adhesives are free from emulsifiers.

Examples of emulsifiers are anionic, cationic, or nonionic emulsifiers. Examples of anionic emulsifiers are alkyl sulfates having a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, full esters and monoesters of sulfosuccinic acid with monohydric alcohols or alkylphenols. Examples of nonionic emulsifiers are alkyl polyglycol ethers or alkylaryl polyglycol ethers having 8 to 40 ethylene oxide units.

Essential to the present invention is that the emulsion polymerization is carried out in continuous regime. By continuous polymerization is meant customarily a polymerization process in which the polymerization reactor or a reactor cascade is supplied continuously with reactants, such as monomers a) and/or optionally monomers b), optionally protective colloids, and optionally initiators, and polymerization mixture or polymerization product is withdrawn from said reactor or reactor cascade continuously at the same rate; in other words, the volume flow resulting from the continuous operation is equal to the sum of all of the component flows supplied continuously to the operation.

Essential to the invention, then, is the preparation of the polyvinyl esters by aqueous, radically initiated, continuous emulsion polymerization, preferably in a stirred tank cascade having at least two pressure reactors connected in series, and subsequently at least one low-pressure reactor.

The polymerization is carried out preferably in at least two pressure reactors connected in series and subsequently continued in at least one low-pressure reactor. As pressure reactors and low-pressure reactors it is possible to use the conventional, correspondingly dimensioned steel reactors with stirring facility, heating/cooling system, and lines for supplying the reactants and removing the products, respectively. The preferred plant configuration consists of two series-connected pressure reactors and one or two downstream low-pressure reactors. Where two or more low-pressure reactors are used, they may be operated either alternately (in parallel) or serially (in series). Larger cascades with more than two pressure reactors can be used, but are not always desirable owing to the associated sharp increase in the complexity of the plant.

The operation is generally conducted in such a way that in all of the pressure reactors the sum of the incoming mass flows is equal to the sum of the outgoing mass flows. The low-pressure reactors are preferably operated alongside one another and utilized alternately. The pressure in the series-connected pressure reactors is generally set in such a way as to result in a decreasing pressure gradient from the first to the last of the series-connected pressure reactors, ensuring the flow of mass in the pressure reactor cascade. Mass transport from the last pressure reactor into the downstream low-pressure reactor may be accomplished, for example, by pressure-regulated valves or by a pump to the same extent as the mass flows into the upstream pressure reactors are supplied.

Before the beginning of the polymerization, the pressure reactors are generally filled to an extent of 50% to 80% of the volume with a polymer dispersion which preferably corresponds to the end product of the polymerization in terms of copolymer composition, nature and amount of the surface-active compound(s) (emulsifiers and protective colloids, more particularly polyvinyl alcohols), and also particle size and solids content. This can be done by preparing this dispersion by batch polymerization in the pressure reactors, or by filling the pressure reactors with a separately prepared dispersion.

In one preferred embodiment, if ethylene is being copolymerized, the pressure reactors are subsequently charged with ethylene. The ethylene pressure is generally regulated in such a way as to result in a decreasing pressure gradient from the first to the last of the series-connected pressure reactors. The difference in pressure between two series-connected pressure reactors is preferably 2 to 40 bar.

Preferably 50 to 100 wt %, more preferably 60 to 95 wt %, and most preferably 75 to 90 wt % of vinyl esters a), based on the total weight of all the vinyl esters a), is included in the initial charge, or metered in, in the first pressure reactor, and the remainder is metered into the subsequent pressure reactors. Monomer b1), more particularly ethylene, is added preferably to an extent of at least 50 wt %, and more preferably completely, in the first pressure reactor, and any remainder is included in the initial charge or metered into the subsequent pressure reactors. The monomers b2) can be added partly or wholly in the first pressure reactor or partly or wholly in one of the further pressure reactors. A portion of the monomers b2) may also not be metered in until the low-pressure reactor. The addition of the stated auxiliary monomers may take place wholly or partly both in the first pressure reactor and in one of the subsequent pressure reactors, or in the low-pressure reactor. With preference the auxiliary monomers are metered completely into the first pressure reactor.

The polyvinyl alcohols—that is, in particular, the medium-viscosity polyvinyl alcohol, optionally the high-viscosity polyvinyl alcohol, and optionally the low-viscosity polyvinyl alcohol—can be added completely in the first pressure reactor, or added partly in the first pressure reactor, with the remainder being added in further pressure reactors and/or in the subsequent low-pressure reactors.

Preferably at least 50 wt %, and in one preferred embodiment all, of the polyvinyl alcohols are included in the initial charge or metered into the first pressure reactor, and any remainder is included in the initial charge or metered into the subsequent pressure reactors. With particular preference all of the polyvinyl alcohols are included in the initial charge or, more particularly, metered into the first pressure reactor.

The medium-viscosity polyvinyl alcohol, with particular preference, is completely included in the initial charge or metered into the first pressure reactor. For example, 50 to 100 wt %, more particularly 90 to 100 wt %, and more preferably 100 wt % of the medium-viscosity polyvinyl alcohol, based on the total weight of the medium-viscosity polyvinyl alcohol used overall, can be included in the initial charge or metered into the first pressure reactor, and the remainder can be included in the initial charge or metered into the subsequent pressure reactors.

It is also preferred for 50 to 100 wt %, more particularly 90 to 100 wt %, and more preferably 100 wt %, based on the total weight of the high-viscosity polyvinyl alcohol used overall, of the high-viscosity polyvinyl alcohol to be included in the initial charge or metered into the first pressure reactor, and for the remainder to be included in the initial charge or metered into the subsequent pressure reactors.

The polymerization is initiated preferably with a redox system composed of oxidation component and reduction component, with preferably both components being metered into all pressure reactors. The monomer conversion is controlled with the initiator feed. In total the initiators are metered in such a way as to ensure continuous polymerization, and the polymerization in the first pressure reactor is taken to a conversion of preferably at least 30 wt %, and the polymerization in the last pressure reactor is taken to a conversion of preferably at least 90 wt %, based in each case on the total weight of the monomers used in the process.

The average solids content in the first pressure reactor is preferably 15 to 40 wt % and more preferably 20 to 30 wt %. The average solids content in the last of the series-connected pressure reactors is preferably 30 to 75 wt % and more preferably 40 to 60 wt %. By way of these distributions in solids content it is also possible to influence the viscosities of the polyvinyl ester dispersions.

The feed rates of the reactants overall are set in such a way as to result in average residence times of preferably 60 to 240 minutes in total in the pressure reactor cascade.

After the end of the polymerization in the pressure reactor cascade, postpolymerization may be carried out in the low-pressure reactor for the purpose of removal of residual monomer, employing known techniques, generally by means of postpolymerization initiated using redox catalyst. In the low-pressure reactor, preferably under atmospheric pressure or below, in other words at a pressure of ≤1 bar abs, and at a temperature of 30° C. to 60° C., polymerization is taken to completion. The polymerization is continued preferably up to a conversion of at least 99 wt %, based on the total weight of the monomers used in the process, more preferably to a free monomer content of ≤1000 ppm.

Any volatile residual monomers can be removed subsequently by distillation, preferably under reduced pressure, and optionally with inert entraining gases such as air, nitrogen, or steam being passed through or over the dispersion.

The aqueous dispersions or dispersion-based adhesives of the invention have a solids content of preferably 30 to 75 wt %, more preferably 50 to 60 wt %. The remaining fractions preferably comprise water. The amounts of solid and of water add up in total to 100 wt %.

The dispersion-based adhesives comprise preferably at least 40 wt %, more preferably at least 50 wt %, and most preferably 60 wt % of polyvinyl esters. The dispersion-based adhesives comprise preferably not more than 99 wt % and more preferably not more than 95 wt % of polyvinyl esters. The figures in wt % are based in each case on the dry weight of the dispersion-based adhesives.

The dispersion-based adhesives optionally further comprise one or more adjuvants, examples being plasticizers, such as phthalates, benzoates, or adipates, film-forming assistants, such as triacetin or glycols, more particularly butyl glycol, butyl diglycol, butyldipropylene glycol, and butyltripropylene glycol, wetting agents, surfactants in general, thickeners such as polyacrylates, polyurethanes, cellulose ethers, or polyvinyl alcohols, defoamers, tackifiers, or other adjuvants customary in the formulation of adhesives.

The proportion of these adjuvants may be, for example, up to 40 wt %, preferably 0 to 25 wt %, more preferably 1 to 15 wt %, very preferably 1 to 10 wt %, and most preferably 1 to 5 wt %, based in each case on the dry weight of the dispersion-based adhesives.

The dispersion-based adhesives may be prepared by the methods commonplace for this purpose, in general by mixing of the aforesaid components. The mixing may take place in conventional mixers, such as stirring mechanisms or dissolvers, for example. Mixing takes place preferably at temperatures of 5 to 50° C., more preferably 15 to 40° C., and most preferably 20 to 30° C.

The dispersion-based adhesives of the invention may be used in the commonplace machine application methods for dispersion-based adhesives, such as in the nozzle or roll application processes, for example. The dispersion-based adhesives in this case are applied to substrates. Application may take place continuously, in lines, or dotwise. In this context, the dispersion-based adhesives of the invention are suitable for adhesively bonding a variety of substrates, preferably paper, card, wood, fiber materials, coated cartons and also for bonding cellulosic materials to plastics such as polymeric films, examples being polyethylene, polyvinyl chloride, polyamide, polyester, or polystyrene films. The dispersion-based adhesives find use in particular as paper adhesives, packaging adhesives, wood adhesives, and bonding agents for woven and non-woven fiber materials. The dispersion-based adhesives possess particular suitability for the adhesive bonding of cellulosic substrates, more particularly paper, card, or cotton fabric, in each case to polymeric films, or for the bonding of polymeric films to one another (film/film bonding).

The dispersion-based adhesives of the invention are extremely suitable for application by machine application methods. In this way the incidence of unwanted depositions of adhesive on the application nozzle, or of uncontrolled "splashes", can be avoided to the extent desired with the dispersion-based adhesives of the invention. The dispersion-based adhesives exhibit advantageous rheological properties, such as low shear thinning. With the dispersion-based adhesives of the invention it is also possible to achieve the rapid setting rate required in the case of machine methods. The dispersion-based adhesives are also stable in storage. A further surprise was that in the procedure according to the invention, there is no need to add emulsifiers to the dispersion-based adhesives or polyvinyl ester dispersions, and the desired performance properties can nevertheless be achieved.

The examples which follow serve for further elucidation of the invention:

Inventive Example 1: Continuous Polymerization

In a reactor cascade consisting of the two pressure reactors R1 (first reactor; volume: 18 liters) and R2 (second reactor; volume: 18 liters) and also of the unpressurized reactor R3 (volume: 47 liters), each equipped with a heating jacket, stirrer, and metering facilities, a continuous emulsion polymerization was carried out. The three reactors are connected with one another by pipelines. The mass stream traverses the reactor cascade beginning in the first pressure reactor R1, then through the second pressure reactor R2, and lastly through the unpressurized reactor R3. Starting materials are supplied continuously and the end product is withdrawn continuously from the unpressurized reactor R3.

The pressure reactor R1 was charged with 9.9 kg of an aqueous polymer dispersion which corresponded to the end product in terms of the monomer composition, nature and amount of protective colloid, and also particle size and solids content. The pressure reactor R2 was filled completely with the aforesaid polymer dispersion. The polymer dispersion had been prepared by emulsion polymerization in batch mode by known processes.

Added to the first pressure reactor R1 additionally were 2.7 kg of vinyl acetate, 1.4 kg of a 10.3% strength aqueous solution of the polyvinyl alcohol C523 (degree of hydrolysis: 88 mol %; Höppler viscosity (determined at 20° C. in accordance with DIN 53015, in 4% strength aqueous solution): 23 mPas), 1 g of a 10% strength aqueous solution of ammonium iron(II) sulfate, and 2.0 kg of water. The pH was set to 3.8 using formic acid. Reactor R1 was heated to 60° C. and reactor R2 to 65° C. The first reactor R1 was charged with ethylene, and consequently a pressure of 60 bar was established in the first reactor R1, and in the second reactor R2 a pressure of 55 bar was established, controlled via pressure valves. These pressures were maintained during the emulsion polymerization by further supply of ethylene.

Metered subsequently into the reactor R1 were potassium persulfate (3% strength aqueous solution), with a metering rate of 90 g/h, and sodium formaldehyde-sulfoxylate (1.5% strength aqueous solution), with a metering rate of 90 g/h. With the start of the polymerization reaction, evident from the increase in temperature, the following components were metered into the reactor R1 with the following metering rates:

3.5 kg/h vinyl acetate,
900 g/h ethylene, and
3.7 kg/h an aqueous mixture comprising 4.2 wt % of polyvinyl alcohol C523 and 30 ppm of ammonium iron(II) sulfate with a pH of 3.8, set using formic acid.

Simultaneously with the start of the metering into reactor R1, the following components were metered into the reactor R2, with the following metering rates:

612 g/h vinyl acetate,
450 g/h potassium persulfate (3% strength aqueous solution) and
450 g/h sodium formaldehyde-sulfoxylate (1.5% strength aqueous solution).

Added to the unpressurized reactor R3, continuously, are the following components, with the following metering rates:

70 g/h tert-butyl hydroperoxide (10% strength aqueous solution),
120 g/h sodium formaldehyde-sulfoxylate (5% strength aqueous solution).

The operation was carried out in a continuous regime for 24 hours. Additional details concerning the resultant polymer dispersion are reported in table 1. The properties of the polymer dispersion are set out in table 2.

TABLE 1

Composition of the polymer dispersions:

| Starting materials | Inventive example 1 [wt %][b] | Comparative example 2 [wt %][b] |
| --- | --- | --- |
| Vinyl acetate | 83 | 82 |
| Ethylene | 17 | 18 |
| Polyvinyl alcohol C523[a] | 3.3 | 3 |

[a]Polyvinyl alcohol having a degree of hydrolysis of 88 mol % and a Höppler viscosity of 23 mPas (determined at 20° C. to DIN 53015, in 4% strength aqueous solution);
[b]figures in wt % based on the total weight of the monomers.

Comparative Example 2: Batch Polymerization

A pressure reactor having a volume of 600 liters was charged with the following components:
140 kg of water,
70 kg of a 10% strength aqueous solution of partially hydrolyzed polyvinyl alcohol C523,
240 g of 98% strength formic acid,
140 g of iron(II) ammonium sulfate solution (10% strength in water).

The pressure reactor was evacuated and then 197 kg of vinyl acetate were added to the initial charge. Thereafter the reactor was heated to 50° C. and charged with an ethylene pressure of 43 bar (corresponding to an amount of 42 kg of ethylene).

The polymerization was initiated by commencement of the metering of a 3% strength aqueous hydrogen peroxide solution at a rate of 350 g/h and of a 10% strength aqueous Na hydroxymethanesulfinate solution (Brüggolit) at a rate of 480 g/h. With the start of polymerization, the temperature was increased from 50° C. to 70° C. 60 minutes after the start of polymerization, vinyl acetate was metered in at a rate of 23 kg/h for 1.5. After the end of the metering of vinyl acetate, the metered additions of the hydrogen peroxide solution and of the Na hydroxymethanesulfinate solution were continued for 60 minutes more. The total polymerization time was 3.5 hours.

The resulting polymer dispersion was subsequently transferred to an unpressurized reactor. A pressure of 0.7 mbar was applied to the unpressurized reactor. Introduced into the unpressurized reactor were 880 g of a 10% strength aqueous tert-butyl hydroperoxide solution and 580 kg of an aqueous 10% strength Na hydroxymethanesulfinate solution (Brüggolit), and postpolymerization was carried out. The pH was adjusted to 4.5 by addition of aqueous sodium hydroxide solution (10% strength). Lastly the batch was filtered with a sieve having a mesh size of 150 µm.

Further details of the resultant polymer dispersion are reported in table 1. The properties of the polymer dispersion are set out in table 2.

Nozzle Application Method: Buildup:

The dispersion-based adhesives were applied by nozzle application to a rotating stainless steel roll.

The stainless steel roll had a circumference of 80 cm and rotated about its own axis at a speed of 100, 120 or 140 revolutions/min.

The dispersion-based adhesives were applied using an HHS application system with valves of type GKD4-114-2m and nozzles of type LVK-4. The nozzles were mounted perpendicularly above the roll surface at a distance of 4 mm. The dispersion-based adhesives were adjusted to a viscosity of 800 mPas by dilution with water and were supplied to the nozzles via hose lines, by means of a piston pump, using a pressure of 9 bar. The application of the dispersion-based adhesives through the nozzles onto the stainless steel roll was pulsed, with the nozzles being opened and closed again at a constant rate. One cycle of single opening and closing of the nozzle is referred to as a pulse. 18 pulses of the nozzle per rotation of the stainless steel roll were set. The dispersion-based adhesives were straightaway scraped from the stainless steel roll with a plastic scraper.

Testing took place under standard conditions at 23° C. and a relative humidity of 50%.

120 minutes after the beginning of nozzle application, a measurement was made of the size of the conical buildup on the nozzle. The results of the testing are set out in table 2.

Splashing Characteristics on Roll Application:

Testing took place on a roll mill under standard conditions at 23° C. and a relative humidity of 50%. The first roll had a diameter of 8 cm and dipped into a bath of dispersion-based adhesive. The axis of a second roll was positioned parallel to the axis of the first roll and also perpendicularly above the first roll. The second roll likewise had a diameter of 8 cm. The two rolls rotated in opposite directions, each at a rotary speed of 60 rpm. By way of the width of the nip between the two rolls, the amount of dispersion-based adhesive transferred from the first roll to the second roll is adjusted. The nip width was 0.4 mm.

An application disk was mounted at a distance of 0.2 mm above the second roll. The application disk had a diameter of 12 cm and a width of 2 cm.

Plexiglas disks were mounted at a distance of 5 cm from the roll mill.

The rotary speed of the application disk was raised in steps, starting from an initial speed of 300 rpm, by a further 100 rpm each minute until the first drop of dispersion-based adhesive detached from the application disk struck a Plexiglas disk. The corresponding rotary speed is reported for the particular dispersion-based adhesive in table 2.

Determination of the Polydispersity PD and of the Weight-Average Particle Diameter Dw:

The determination took place by static light scattering with the LS 13320 instrument from BeckmanCoulter.

The dispersion-based adhesive of inventive example 1 exhibits good rheological properties, as desired for machine application methods, and leads in use to the desired, rapid setting rates and good mechanical properties.

Furthermore, the application characteristics of inventive example 1 are significantly advantageous relative to comparative example 2, as shown, for example, on application with the roll mill. In comparative example 2, splashing begins at just 500 revolutions per minute, leading to an imprecise application of adhesive in use. In contrast, inventive example 1 displays an advantageously low splashing tendency, since splashing begins only at 1000 revolutions per minute. As a result, roll application methods can be operated much more quickly and precisely.

TABLE 2

Properties of polymer dispersions and results of their testing:

|  | Inventive example 1 | Comparative example 2 |
|---|---|---|
| Properties of the polymer dispersions: | | |
| Solids content [%] | 53.6 | 55.3 |
| Brookfield viscosity [mPas] | 3580 | 7210 |
| pH | 4.5 | 4.5 |
| Weight-average particle diameter Dw [µm] | 4.86 | 4.55 |
| Polydispersity PD | 46.3 | 8.8 |
| Glass transition temperature Tg [° C.] | 5.08 | 7.8 |
| Roll application method: | | |
| Start of initial splashing | 1000 rpm | 500 rpm |
| Nozzle application method: | | |
| Extent of buildup at: | | |
| 100 rpm | 1.5 mm | 1.5 mm |
| 120 rpm | 2.5 mm | >4 mm |
| 140 rpm | 3.0 mm | >4 mm |

On nozzle application, inventive example 1 exhibits a relatively low tendency toward buildup on the nozzle. The 120 minute test was passed without problems at all speeds, with the buildup on the nozzle reaching a maximum of 3 mm. In the case of comparative example 2, in contrast, the test has to be terminated after less than 120 min at the higher speeds (120 rpm and 140 rpm), since the buildup exceeds 4 mm. For this reason as well, the dispersion-based adhesive of comparative example 2 is inadequate for machine application methods.

The invention claimed is:

1. A method for applying dispersion-based adhesives comprising one or more polyvinyl esters, wherein
   the one or more polyvinyl esters are prepared by radically initiated, continuous emulsion polymerization of one or more vinyl esters
   by supplying a polymerization reactor or a reactor cascade continuously with said vinyl esters and continuously withdrawing a polymerization mixture from said reactor or reactor cascade, wherein
   the polyvinyl esters have a polydispersity PD of ≥21, the polydispersity PD being the ratio of weight-average particle diameter Dw to number-average particle diameter Dn, PD=Dw/Dn, determined using a Beckmann Coulter LS instrument according to ISO 13320; and
   the dispersion-based adhesives are applied to the substrate by machine application methods.

2. The method for applying dispersion-based adhesives as claimed in claim 1, wherein one or more polyvinyl esters are based on 50 to 90 wt % of the one or more vinyl esters, and 10 to 25 wt % of ethylene, based on the total weight of the monomers.

3. The method for applying dispersion-based adhesives as claimed in claim 1, wherein the emulsion polymerization is carried out at a temperature of 40° C. to 100° C.

4. The method for applying dispersion-based adhesives as claimed in claim 1, wherein the emulsion polymerization is carried out using 0.5 to 6.0 wt % of one or more polyvinyl alcohols having viscosities of 19 to 39 mPas as determined by the Höppler method according to DIN 53015 at 20° C. in 4% strength aqueous solution.

5. The method for applying dispersion-based adhesives as claimed in claim 1, wherein the dispersion-based adhesives are free from emulsifiers.

6. The method for applying dispersion-based adhesives as claimed in claim 5, wherein the average residence time in the polymerization reactor or in the pressure reactor cascade is 60 to 240 minutes.

7. The method for applying dispersion-based adhesives as claimed in claim 1, wherein the machine application methods are selected from the group consisting of nozzle application methods and roll application methods.

8. The method for applying dispersion-based adhesives as claimed in claim 1, wherein the substrate is selected from the group consisting of paper and plastics.

9. The method for applying dispersion-based adhesives as claimed in claim 1, wherein a reactor cascade is continuously supplied with said vinyl esters.

10. The method for applying dispersion-based adhesives as claimed in claim 1, wherein the emulsion polymerization takes place in the presence of at least one medium-viscosity polyvinyl alcohol having a viscosity of 19 to 39 mPas and of at least one high-viscosity polyvinyl alcohol having a viscosity of 40 to 60 mPas.

11. The method for applying dispersion-based adhesives as claimed in claim 1, wherein the emulsion polymerization is carried out at a temperature of 50° C. to 100° C.

* * * * *